A. H. G. FOKKER.
FOLDING OR JOINTING AEROPLANE WING FOR TRANSPORTATION OR STORAGE.
APPLICATION FILED FEB. 17, 1921.
1,388,457.
Patented Aug. 23, 1921.
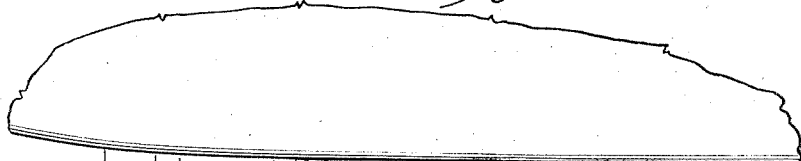
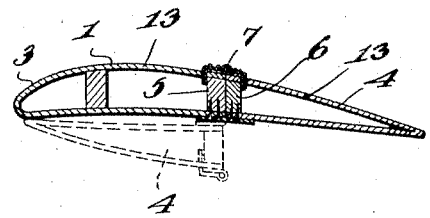
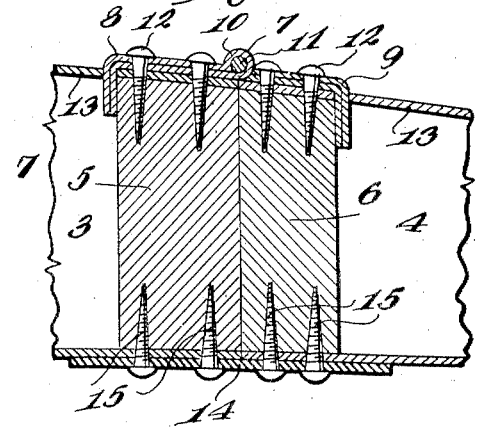
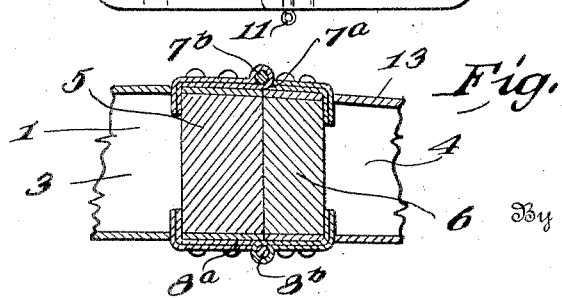
Inventor
Anthony Herman Gerard Fokker,
By B. Singer,
Attorney

UNITED STATES PATENT OFFICE.

ANTHONY HERMAN GERARD FOKKER, OF AMSTERDAM, NETHERLANDS

FOLDING OR JOINTING AEROPLANE-WING FOR TRANSPORTATION OR STORAGE.

1,388,457. Specification of Letters Patent. Patented Aug. 23, 1921.

Application filed February 17, 1921. Serial No. 445,735.

*To all whom it may concern:*

Be it known that I, ANTHONY HERMAN GERARD FOKKER, a subject of the Queen of the Netherlands, residing at Amsterdam, Netherlands, have invented a new and useful Folding or Jointing Aeroplane-Wing for Transportation or Storage, of which the following is a specification.

This invention relates to improvements in aeroplane wings, the object of the invention being to provide an improved aeroplane wing which is divided or jointed along a line running in the direction of the major dimension of the wing, thus allowing part of the wing to be detached or folded, for the purpose of reducing the size of the wing for transportation or storage.

With the above and other objects in view, the invention consists in the construction, combination and arrangement of devices hereinafter described and claimed.

In the accompanying drawings:—

Figure 1 is a plan view of a foldable or jointed aeroplane wing constructed and arranged in accordance with my invention.

Fig. 2 is a transverse sectional view of the same taken on the plane indicated by the line 2—2 of Fig. 1, and showing the wing in extended position in full lines, and in folded position in dotted lines.

Fig. 3 is a detail sectional view of the joint, on a larger scale.

Fig. 4 is a similar view of the same, showing a modification.

The wing or plane 1 may be of any suitable construction and may be made of any suitable material and in accordance with my invention comprises two or more longitudinal sections 3, 4, which are divided along a line running in the direction of the major dimension of the wing, thus allowing the section 4 to be detached from or folded against the section 3. The beams 5, 6, which extend along the meeting edges of said wing sections are secured together on one side by means of hinges 7, the plates 8, 9 of which, with their overlapping tubular portions 10, are detachably secured together by a removable pintle 11 which may be readily withdrawn therefrom or arranged in place as may be required. The hinge plates are here shown as secured to the beams 5, 6 by screws 12 which also pass through the covering 13 of the wing sections.

On the side of the beams 5, 6, opposite the hinges 7, is a flexible coupling member 14 which passes under the joint between the beams and wing sections, and may be made of any suitable flexible material, such as leather or the like. Said coupling member may be secured in place by any suitable means, screws 15 being here shown for this purpose.

It will be readily understood that when the pintle 11 of the hinges 7 has been removed, the section 4 may be folded under or against the section 3 of the wing as shown in dotted lines in Fig. 2, the flexible coupling member 14 being readily bendable for the purpose.

In Fig. 4 I show a modified construction of my invention in which the flexible coupling member 14 is dispensed with and hinges $7^a$, $8^a$ are employed on opposite sides of the wing sections, at the joint, and are respectively provided with removable pintles $7^b$, $8^b$. When one of these pintles has been removed from one of the hinges the wing members may be readily folded on the other hinge, as will be understood, and when the pintles of both the hinges have been removed the wing sections may be entirely separated from each other.

While I have herein shown and described two embodiments of my invention, I would have it understood that other changes may be made without departing from the spirit of my invention and within the scope of the appended claims.

What I claim is:—

1. An aeroplane wing comprising members hingedly connected together along a line running in the direction of the major dimension of the wing to enable said wing to be folded.

2. An aeroplane wing comprising members hingedly connected together along a line running in the direction of the major dimension of the wing to enable said wing to be folded, and embodying detachable hinge members.

3. An aeroplane wing comprising a pair of members, arranged to form a joint between their meeting edges along a line running in the direction of the major dimension of the wing, a flexible coupling member extending across said joint on one side of said members and secured to said members, and a hinge on the opposite side of said members, also extending across the joint and comprising members respectively secured to said wing members and a removable pintle to pivotally connect said hinge members together.

In testimony whereof I affix my signature in presence of two witnesses.

ANTHONY HERMAN GERARD FOKKER.

Witnesses:
 ROB. M. MOONDAG,
 F. AESNER.